United States Patent [19]

Taylor

[11] 3,756,624
[45] Sept. 4, 1973

[54] STABILIZED TOWING VEHICLE AND TRAILER COMBINATION AND INTERCONNECTING HITCH

[76] Inventor: Harry L. Taylor, Harmon Electronics Inc., Grain Valley, Mo. 64029

[22] Filed: Jan. 10, 1972

[21] Appl. No.: 216,551

[52] U.S. Cl............ 280/423 R, 296/23 R, 280/511
[51] Int. Cl............................................ B62d 53/00
[58] Field of Search............... 280/423 R; 296/23 R, 296/23 MC

[56] References Cited
UNITED STATES PATENTS

| 3,276,790 | 10/1966 | McKaig | 296/23 R X |
| 3,383,119 | 5/1968 | Carroll | 280/426 |
| 3,415,566 | 12/1968 | Kerrigan | 296/1 S |

FOREIGN PATENTS OR APPLICATIONS

| 630,243 | 7/1963 | Belgium | 296/23 R |
| 748,762 | 11/1963 | Canada | 296/23 MC |
| 1,250,559 | 12/1960 | France | 296/23 MC |

Primary Examiner—Leo Friaglia
Attorney—D. A. N. Chase et al.

[57] ABSTRACT

A towing vehicle and trailer combination in which the effect each vehicle has on the other is minimized even at high speeds. The trailer has a primary, rear body section and a secondary, front body section which forms a nose that extends forwardly from the primary section. A clearance cavity for the rear portion of the vehicle (assuming normal towing in the forward direction) is defined beneath the nose in front of the primary section. A ball and socket hitch connects the forward end of the nose to the top of the towing vehicle at its front to rear and lateral center, thereby equalizing the hitch weight on the wheels of the vehicle. The trailer has its weight distributed in the primary and secondary sections to locate the center of gravity of the entire trailer forwardly of the center of the primary section. The trailer wheels are disposed substantially at the center of gravity, with the result that the distance between the trailer axle or axles and the rear axle of the towing vehicle is materially shortened and is approximately equal to the wheel base of the vehicle. The hitch is secured to the vehicle top by a unitary, rigid, rectangular baseplate overlying the top. The baseplate has an elevated central portion on which the hitch ball is mounted, and is of a shallow, generally frusto-pyramidal configuration to present four downwardly sloping surfaces radiating from the central portion and facing in forward, rearward, and lateral directions respectively.

9 Claims, 10 Drawing Figures

PATENTED SEP 4 1873

PATENTED SEP 4 1973 3,756,624
SHEET 2 OF 2
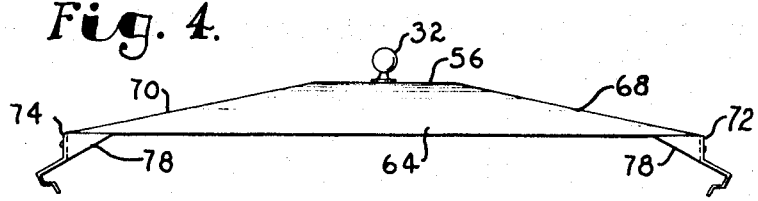
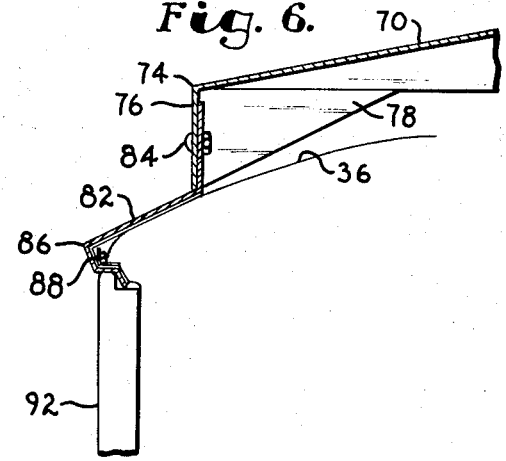
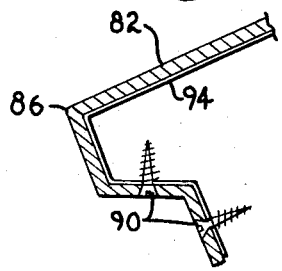
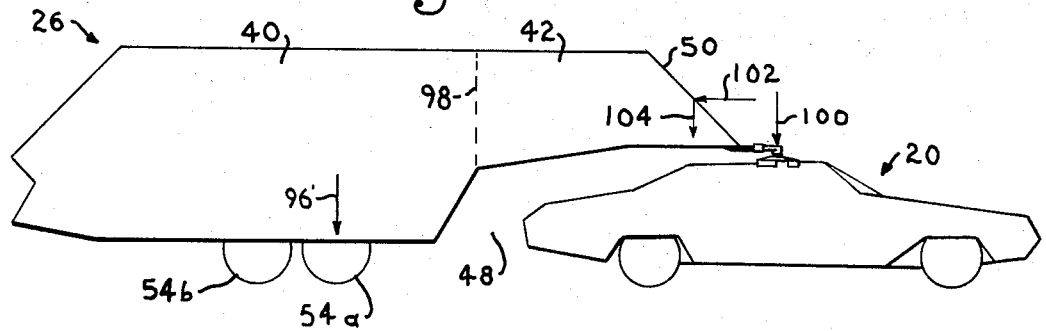
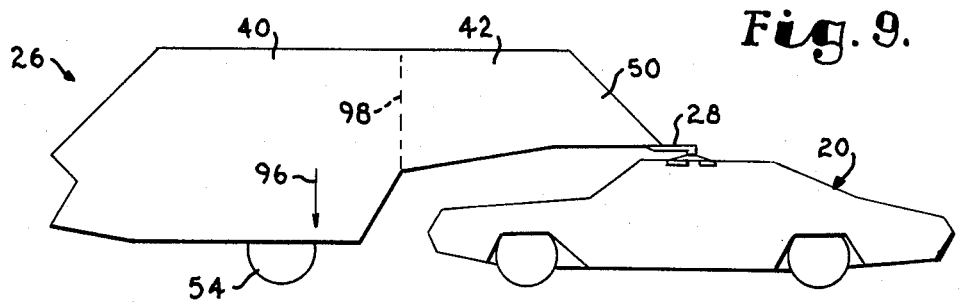

STABILIZED TOWING VEHICLE AND TRAILER COMBINATION AND INTERCONNECTING HITCH

This invention relates to improvements in vehicular trailers and in the manner of connecting a trailer to a towing vehicle.

In recent years, camping trailers and travel trailers have become increasingly popular as a recreational vehicle. In most instances, trailers of this type are essentially a wheeled vehicle having a rectangular configuration with a tongue at the front which is hitched to the bumper of a towing vehicle. Simple bumper hitches are commonly utilized, resulting in the application of the entire hitch weight to the rear bumper of the towing vehicle. It may be appreciated that this is a very unstable configuration and renders the vehicular combination susceptible to sway, jackknifing, poor braking characteristics, and general instability at highway speeds.

The difficulties outlined above may be minimized somewhat through the use of an equalizer hitch. Hitches of this type, in fact, are mandatory when it is desired to tow a relatively large travel trailer with a conventional automobile. However, although it is easier to tow a trailer with an equalizer hitch and greater stability in the automobile frame results by the equalization of the hitch load, marked instability in the overall vehicular combination remains since the hitch still is utilized essentially as a link between two vehicles, each of which has a material and adverse affect on the other at road speeds.

It is, therefore, the primary object of the present invention to provide a towing vehicle and trailer combination in which the affect each vehicle has on the other is minimized even at high speeds, resulting insubstantially increased stability both in the towing vehicle and in the overall combination.

As a corollary to the foregoing object, it is an important aim of this invention to provide a vehicular combination as aforesaid in which each vehicle is substantially independent of the other insofar as its operational and functional characteristics are concerned, while at the same time providing an interconnection between the towing vehicle and the towed vehicle that produces an integrated vehicular combination.

Furthermore, it is an important object of this invention to provide hitch arrangement for interconnecting the towing and towed vehicles, wherein the connection is made between the tongue of the trailer and the top of the towing vehicle in a manner to substantially equalize the hitch load applied to the wheels of the towing vehicle and to provide a hitch that is adapted for use in the integrated vehicular combination set forth in the foregoing objects.

Additionally, it is an important object of this invention to provide a trailer that includes a primary, rear body section and a secondary, front body section extending forwardly over the rear of the towing vehicle to a hitch connection on the top thereof, wherein the center of gravity of the trailer is located forwardly of the center of the primary section in order to enable the axle or axles of the trailer wheels to be disposed in relatively closely spaced relationship to the rear axle of the towing vehicle.

In the drawings:

FIG. 4 is a front elevational view of the structure shown in FIG. 2;

FIG. 6 is an enlarged, fragmentary, cross-sectional view showing the manner in which the baseplate of the hitch structure is attached to the automobile;

FIG. 7 is a detail view of the outer end portion of one of the plate members utilized to attach the baseplate to the automobile;

FIG. 9 and 10 are diagrammatic, side elevational views of the automobile-trailer combination illustrating various operational aspects of the combination to be discussed in the succeeding specification.

Figure 1:
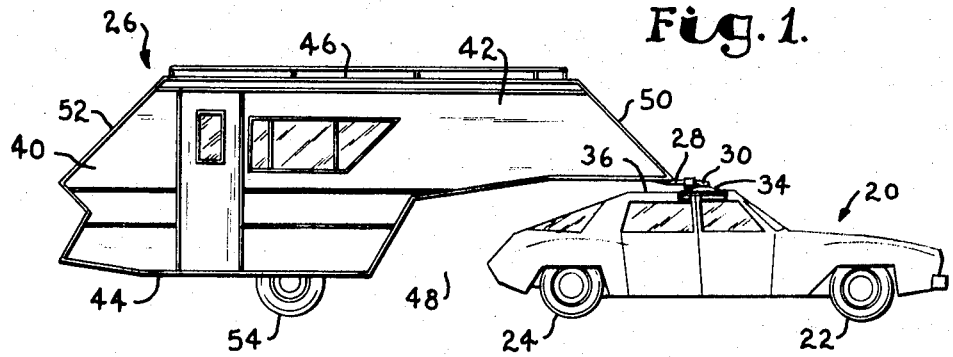
FIG. 1 is a side elevational view of the vehicular combination is of the present invention, showing an automobile towing a camping trailer.
Figure 5:
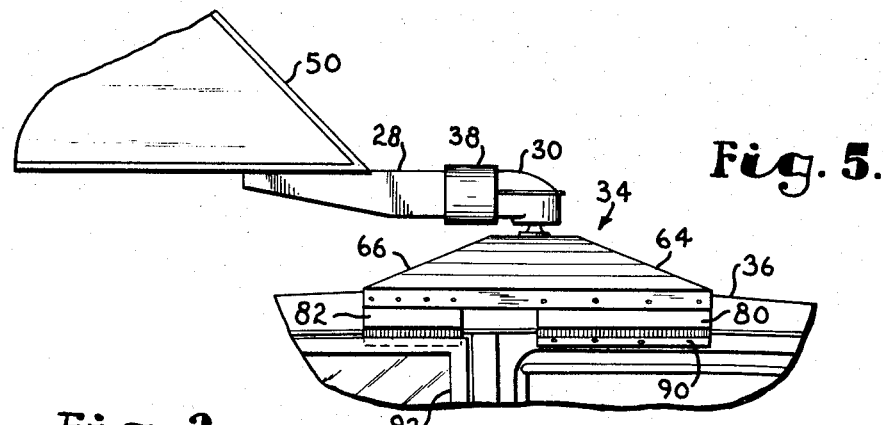
FIG. 5 is a fragmentary, greatly enlarged view of the top of the automobile and the tongue portion of the trailer shown in FIG. 1, illustrating the hitch in use.
Figure 2:
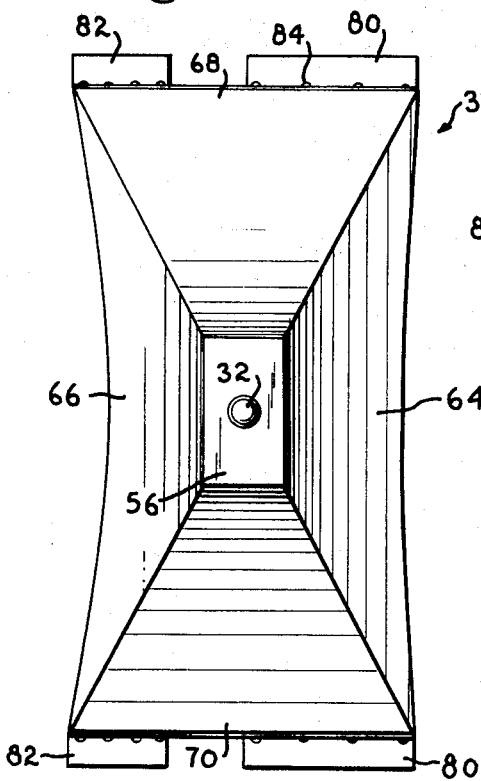
FIG. 2 is a top plan view of the baseplate of the hitch structure of the present invention.
Figure 3:
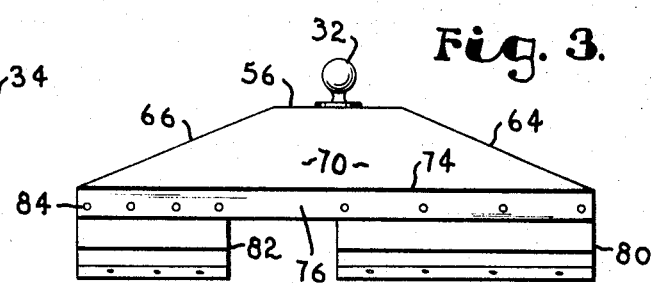
FIG. 3 is a side elevational view of the structure shown in FIG. 2.
Figure 8:
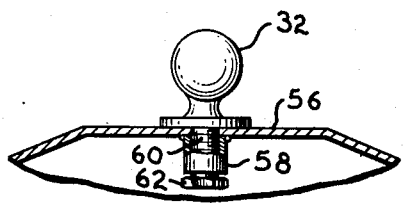
FIG. 8 is an enlarged, fragmentary, cross-sectional view showing the top of the baseplate.

Referring initially to FIGS. 1 and 5, a conventional four door sedan is illustrated at 20 having the usual front wheels 22 and rear wheels 24. A camping trailer 26 is being towed by the vehicle 20, and is provided with a tongue 28 having a split socket 30 at its forward end. The socket 30 fits over a hitch ball 32 (seen in FIGS. 2–4 and 8) mounted on a baseplate 34. The baseplate 34 forms a part of the hitch structure of the present invention and overlies the top 36 of the vehicle 20 at a zone thereon which is midway between the front and rear bumpers of the vehicle. The split socket 30 is a conventional releasable hitch socket and is locked closed by a spring-loaded sleeve 38 to form a positive connection with the ball 32.

It may be seen in FIG. 1 that the trailer 26 has a primary, rear body section 40 and a secondary, front body section 42 which presents a forwardly extending nose that projects over the rear portion of the vehicle 20 to the tongue 28 at the forward end of the nose. The rear section 40 defines the bottom 44 of the trailer, and the two sections 40 and 42 have a common, horizontal top 46. The front section or nose 42 is integral with the rear section 40 and forms a forwardly extending continuation of the interior compartment of the trailer, except for the clearance cavity 48 left beneath the nose 42 in front of the primary, rear section 40. Accordingly, the elevated nose section 42 would commonly be utilized for the sleeping or bunk area of the trailer, with the full height, rear section 40 being reserved for the cooking and living areas of the trailer interior.

It should be noted that the forward end of the nose 42 presents an inclined front surface 50 for reducing wind resistance in forward motion and for producing a downwardly directed force component as will be discussed fully hereinafter. The angle formed by the surface 50 with the horizontal is preferably 45°. Similarly, the top, rear surface 52 of the rear section 40 is inclined at an angle of from 30°–45° from the horizontal to minimize the trailing partial vacuum which would otherwise be significant. Although the trailer 26 illustrated in FIG. 1 is of single axle design and hence employs single left and right wheels 54, a tandem axle arrangement may be utilized for heavier loads as illustrated in FIG. 10 by the dual wheels 54a and 54b.

Referring more particularly to FIGS. 3–8, it may be seen that the baseplate 34 is of generally rectangular configuration as viewed in plan, and is a frustum of a shallow pyramid as viewed in elevation. The baseplate 34 is preferably of heavy metal construction such as boiler plate stock, and directly overlies the top 36 of the vehicle 20. The op of the baseplate 34 is presented by a rectangular, central portion 56, and the ball 32 is centered thereon as is clear in the Figures. A sleeve 58 may be welded on the underside of the central portion 56 to reinforce the hole through which the threaded stud 60 of the ball 32 extends. A nut 62 is threaded over the stud 60 to securely attach the ball 32 to the baseplate 34.

Four downwardly sloping surfaces 64, 66, 68 and 70 radiate from the central portion 56 of the base plate 34 and face in generally forward, rearward, and lateral directions respectively. The side margins 72 and 74 are presented by the ends of the rectangular baseplate 34, and are each provided with a depending, integral flange 76 (FIG. 6). The four corners of the baseplate are reinforced by triangular webs 78.

A pair of irregularly shaped front and rear plate members 80 and 82 respectively are secured to each of the side flanges 76 by machine screws 84 and serve as a means of attaching the baseplate 34 to the body of the vehicle 20. The plate members 80 and 82 are all of identical configuration except for differences in length between the front members 80 and the rear members 82, necessitated by the particular door configuration of the vehicle 20. Accordingly, one of the members 82 is shown in detail in FIGS. 6 and 7 where it may be seen that the member slopes outwardly and downwardly from the side flange 76 to a right angle bend 86, where the remainder of the member is then configured somewhat like a reversed Z to hook over the gutter or edge molding 88 of the top 36 and extend into engagement with the body of the vehicle therebeneath. Rows of sheet metal screws such as illustrated at 90 may be conveniently utilized to fasten the member 82 to the vehicle body, the only modification necessitated being that of the drilling of suitable holes (not shown) for receiving the screws 90. Note in FIGS. 5 and 6 that this arrangement does not interfere with normal closing of the doors of the sedan, the right rear door 92 being shown fully closed in both of these Figures.

If desired, a layer of a suitable padding material 94 may be employed on the underside of each of the members 80 and 82 to prevent the hitch structure from scarring the body of the vehicle. This leaves the paint unmarred so as not to distract from the appearance of the vehicle at times when the hitch structure is removed therefrom. Note in this regard that the holes drilled for the sheet metal screws 90 are concealed when the doors of the sedan are closed.

In use, the baseplate 34 is secured to the vehicle with the screws 90 as discussed above. It should be understood that the exact configuration of the baseplate 34 will be governed by each individual car body for proper fitting and aesthetics. However, in all instances the hitch ball 32 will be exactly centered between the side margins 72 and 74, and such margins will be located in the same relative positions adjacent the respective edges of the car top 36. Furthermore, the baseplate 34 is centered front to rear with respect to the bumpers of the vehicle 20, with the result that the ball 32 is exactly centered, or essentially so, both front to rear and side to side with respect to the eometry of the vehicle 20.

By locating the hitch ball 32 in a manner as just discussed, the hitch weight of the trailer 26 is substantially equally distributed to the four wheels of the vehicle 20. Furthermore, since the vehicle 20 is free to undergo 360° angular movement about the vertical axis of the hitch ball 32, jackknifing of the car-trailer combination is absolutely precluded and the vehicle 20 may be used to push the trailer 26 in difficult parking and maneuvering situations as illustrated in FIG. 9. Although it may not be readily apparent, reversing the automobile 180° is easily accomplished by a single forward turn and backing operation.

In FIG. 9 a vertical arrow 96 represents the weight of the trailer at its center of gravity. It is important to not that such center of gravity is located forwardly of the center of the primary, rear body section 40 of the trailer 26. The front end of the rear section 40 and the beginning of the front section or nose 42 is represented by the broken line 98. This location of the center of gravity of the entire trailer 26 is achieved by distributing the weight of the trailer in the respective sections 40 and 42 approximately in accordance with the relative volumes of the two sections to avoid concentrating the weight solely at the rear of the trailer configuration.

This same relationship of the center of gravity to the center of the rear section 40 exists in larger and longer trailer configurations, as illustrated in FIG. 10 where a tandem axle is utilized to support the load. Note that the arrow 96' in FIG. 10 at the center of gravity is spaced forwardly with respect to the center of the rear trailer section 40. It is to be understood in this regard that the "center" of the rear trailer section in FIGS. 9 and 10 is the transverse vertical plane midway along the length of such section from the front 98 thereof to the rear.

The significance of the location of the center of gravity in the trailer configuration of the present invention may be appreciated by considering the locations of the wheels 54 in the single axle version and the wheels 54a and 54b in the tandem axle version. In both cases the center axis of the trailer wheels is very near the center of gravity and would ideally be in exact alignment with the center of gravity were it not for the necessity of maintaining a certain minimum hitch weight that will assure that a downwardly directed force (represented by the arrow 100) is always applied to the vehicle 20 at the hitch. (The center axis is that of the axle of the wheels 54 in the single axle version, and in the tandem axle version comprises an axis midway between the two axles of the tandem arrangement.) Accordingly, the distance between the center axis of the trailer axle or axles and the rear axle of the towing vehicle 20 is not greater than approximately equal to the wheel base of the vehicle 20. This may be seen in viewing FIGS. 1 and 10, although it should be understood that the exact relationship between such distance and the wheel base of the vehicle 20 will depend upon the particular automobile used as the towing vehicle. Nonetheless, the relationship is a valid approximation, and results in a trailer axle to rear car axle distance that is significantly shorter than comparable car-trailer configurations in which the trailer is of conventional design and is attached to the car by a bumper hitch. Specifically, in the present invention the center of gravity of the trailer is located approximately one-fourth to one-third of the way back from the front of the primary, rear section 40, with the center axis of the trailer wheels being spaced rearwardly of the center of gravity approximately 1 to 1 and ½ feet in trailers having an overall length of approximately 20 to 30 feet.

The arrow 102 in FIG. 10 represents the force of the wind against the front surface 50 when the trailer is moving at road speeds. By virtue of the angularity of the front surface 50, wind resistance is reduced and, simultaneously, a downwardly directed force component 104 is produced by the wind which, at high speeds, tends to hold the car-trailer combination on the road and counteract any tendency to lose vertical stability. In actual driving tests under freeway conditions, it has been found that the automobile does not lose its usual road feel even at speeds in excess of 80 miles per hour. It may also be appreciated that the sloping surfaces 64, 66, 68 and 70 of the hitch baseplate 30 also minimize wind resistance; furthermore, the pyramidal configuration of the unitary baseplate serves to increase its structural strength and rigidity.

The overall effect of the top hitch and forwardly displaced center of gravity discussed hereinabove is to produce a towing and towed vehicle combination in which the effect of each vehicle on the other is minimized to a point where the driver of the towing vehicle is not conscious of the presence of the trailer being towed. The car may be swerved from lane to lane under high speed freeway conditions with no more body sway than would normally be permitted by the particular suspension. Accordingly, it may be appreciated that an extremely stable configuration is provided by the present invention which permits the trailer to be towed at normal highway crusing speeds and minimizes the danger of jackknifing or roll in the event that quick maneuvers must be undertaken in an emergency situation. The only apparent effect of the trailer on the towing vehicle is an awareness on the part of the driver that additional power is required for acceleration and to maintain a given cruising speed, due to the additional load on the engine created by the weight of the trailer. Even so, small, relatively low powered passenger vehicles such as Toyotas and Volkswagens can readily handle a fully equipped eighteen foot camping trailer, and full sized passenger cars can readily tow larger trailers at freeway cruising speeds with full stability and adequate reverse power for passing situations and normal grades.

What is claimed is:

1. Hitch structure for connecting the tongue of a trailer to the top of a towing vehicle, said structure comprising:

a unitary, rigid baseplate adapted to overlie said top of the vehicle and extend thereacross from side to side.

said baseplate having an elevated central portion and presenting downwardly sloping surfaces radiating from said central portion and facing in generally forward, rearward, and lateral directions, said baseplate having opposed side margins adapted for disposition adjacent the edges of said top at the sides thereof;

meanS secured to said side margins for attaching said baseplate to said vehicle; and a hitch component mounted on said central portion and adapted to be releasably connected with a mating hitch part carried by said tongue.

2. Hitch structure as claimed in claim 1, wherein said baseplate is rectangular and presents a shallow, generally frusto-pyramidal configuration, there being four of said surfaces facing in said forward, rearward, and lateral directions respectively.

3. Hitch structure as claimed in claim 1, wherein said attaching means comprises irregularly shaped plate members projecting outwardly and downwardly from said side margins and configured to extend over said edges of the top into engagement with the body of the vehicle therebeneath, and a plurality of fasteners for securing said members to said body.

4. A stabilized towing vehicle and trailer combination comprising:

a wheeled towing vehicle having front and rear axles;

a trailer provided with a primary, rear body section having a top and a bottom, a secondary, front body section spaced above the plane of said bottom and integral with the top portion of said primary section, and ground-engaging wheel units supporting said trailer and having a center axis extending transversely thereof, said secondary section presenting a forwardly extending nose defining a cavity therebeneath in front of said primary section into which the rear portion of said vehicle normally extends; ball and socket hitch means interconnecting the forward end of said nose and said vehicle, and constituting the sole connection between said vehicle and said trailer; said vehicle having a top presenting a zone thereon approximately midway front to rear and side to side, and structure securing said hitch means to said vehicle at said zone to substantially equalize the forces applied to the wheels of the vehicle, said structure attaching said hitch means to said vehicle top for 360° angular movement of the vehicle with respect to the trailer, said trailer having its weight distributed in said primary and secondary sections to locate the center of gravity of the entire trailer forwardly of the center of said primary section, said wheel units being disposed substantially at said center of gravity to cause the distance between said center axis of the wheel units and the rear axle of said vehicles to be no greater than approximately equal to the wheel base of the vehicle, said structure including a unitary, rigid baseplate overlying said top of the vehicle at said zone and extending thereacross from side to side, said baseplate having an elevated central portion and presenting downwardly sloping surfaces radiating from said central portion and facing in forward, rearward, and lateral directions, said hitch means having a pair of releasably interconnected components, one of said components being mounted on said central portion of the baseplate.

5. Hitch structure for connecting the tongue of a trailer to a towing vehicle having a top with side edges and doors with top edges, said structure comprising: a rigid baseplate adapted to overlie said vehicle top and extend laterally thereacross, said baseplate having an elevated central portion and opposed side margins adapted for disposition adjacent said side edges, means secured to said side margins for attaching said baseplate to said vehicle, said baseplate attaching means comprising a structural member sloping outwardly and downwardly and inwardly for disposition between said top side edges and said door top edges, means associated with said structural member for securing same to said vehicle between said top side edges and said door top edges, and a hitch component mounted on said central portion and adapted to be releasably connected with a mating hitch part carried by said tongue.

6. Hitch structure as set forth in claim 5, wherein said baseplate presents downwardly sloping surfaces radiating from said central portion and facing in generally forward, rearward and lateral directions.

7. Hitch structure as claim in claim 6, wherein said baseplate is rectangular and presents a shallow, generally frustopyramidal configuration.

8. Hitch structure as set forth in claim 5, wherein the portion of said structural member which slopes inwardly is generally of zig-zag shape.

9. Hitch structure as claimed in claim 5, wherein said means for securing said structural member to said vehicle are screw fasteners.

* * * * *